United States Patent [19]
Killion

[11] 3,986,562
[45] Oct. 19, 1976

[54] TURF PERFORATING DEVICE

[76] Inventor: Marvin L. Killion, 510 Pontiac Drive, Gretna, Nebr. 68028

[22] Filed: July 10, 1975

[21] Appl. No.: 594,762

[52] U.S. Cl. .................................... 172/22; 111/6; 111/89
[51] Int. Cl.² ........................................ A01B 45/02
[58] Field of Search ................ 172/21, 22; 111/89, 111/90, 6

[56] References Cited
UNITED STATES PATENTS

| 1,477,097 | 12/1923 | Anderson et al. | 111/89 |
| 1,753,136 | 4/1930 | Scrimger | 111/89 |
| 2,056,337 | 10/1936 | Archibald | 172/21 |
| 2,206,264 | 7/1940 | Rose | 172/21 |
| 2,255,040 | 9/1941 | Helbig | 172/21 |
| 2,302,944 | 11/1942 | Helbig | 172/21 |
| 2,800,066 | 7/1957 | Cohrs et al. | 172/22 |
| 3,802,513 | 4/1974 | Ploenges | 172/21 |

FOREIGN PATENTS OR APPLICATIONS

| 8,949 | 4/1905 | United Kingdom | 172/21 |

Primary Examiner—Paul E. Shapiro
Attorney, Agent, or Firm—Henderson, Strom & Sturm

[57] ABSTRACT

A turf perforating device for aerating lawns by removing plugs therefrom comprising a wheeled frame having a plurality of reciprocating tools connected by a linkage to a crankshaft and each linkage slidably mounted in a pivotable sleeve which prevents binding of the linkage as the frame is moved across the lawn and the tool is disposed in the ground.

10 Claims, 6 Drawing Figures

TURF PERFORATING DEVICE

BACKGROUND OF THE INVENTION

This invention relates to a turf perforating device for perforating a lawn or the like by removing a plurality of plugs therefrom. The aeration of turf is essential if air, water, fertilizers and insecticides are to penetrate the turf.

Several mechanized devices exist wherein a vertical punching motion is employed while the device is pushed or pulled across the surface of the lawn. This traversing motion causes the punching or coring tool which is perforating the turf to compact the forward edge of the hole. Various structures are available to alleviate the hole compaction problem; however, they all relate to the movement of the reciprocating tool and linkage and thus are extremely complicated.

A search of the market place discloses that there is no turf perforator device that plugs the turf, that is light in weight, that is economical to manufacture, and that is extremely effective.

SUMMARY OF THE INVENTION

The turf perforating device of this invention includes a frame supported above the surface of the ground by a plurality of wheels, a crankshaft rotatably mounted on the frame, a plurality of reciprocating units secured to the crankshaft, a sleeve for each reciprocating unit pivotally connected to the frame and having the reciprocating unit slidably disposed therein, a spring connected between each sleeve and the frame to bias the spring in a first position, a tool secured to each reciprocating unit for perforating the turf and a power unit mounted on the frame and connected to the crankshaft for rotating the latter. The pivotal action of the sleeve permits an operator to propel the device at any speed and yet avoid any binding on the reciprocating unit because a tool is on the ground.

It is therefore an object of this invention to provide an improved turf perforating device.

Yet another object is the provision of a turf perforating device having a reciprocating member slidably disposed in a sleeve which is pivotable thus preventing any damage to the reciprocating unit when a portion thereof is embedded in the ground and the device is being propelled in a forward direction.

A further object of this invention is the provision of a turf perforating device utilizing a crankshaft wherein all of the reciprocating units which are connected thereto are disposed through only 180° or one half of the crankshaft, wherein with the power unit connected to the crankshaft in a neutral drive position, the device can be propelled across areas where no perforations are desired or are possible.

Still another object of this invention is to provide a turf perforating device that is simple of construction, economical to manufacture, light in weight, and extremely effective in operation.

These objects and other features and advantages become more apparent upon reference to the following description when taken in conjunction with the appended drawings.

BRIEF DESCRIPTION OF THE DRAWINGS

In the drawings, although various modifications and alternate constructions can be made thereto without departing from the true invention, a preferred embodiment of the invention is illustrated, wherein.

DETAILED DESCRIPTION OF THE PREFERRED EMBODIMENT

Figure 1:
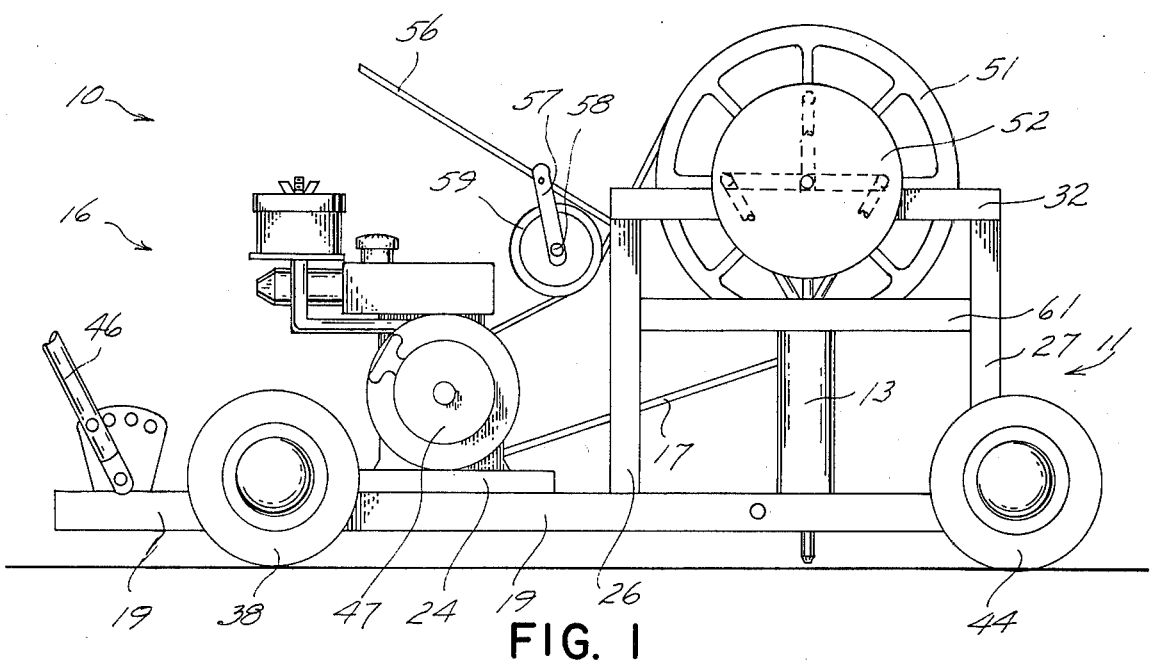
FIG. 1 is a side elevational view of the turf perforating device of this invention.
Figure 2:
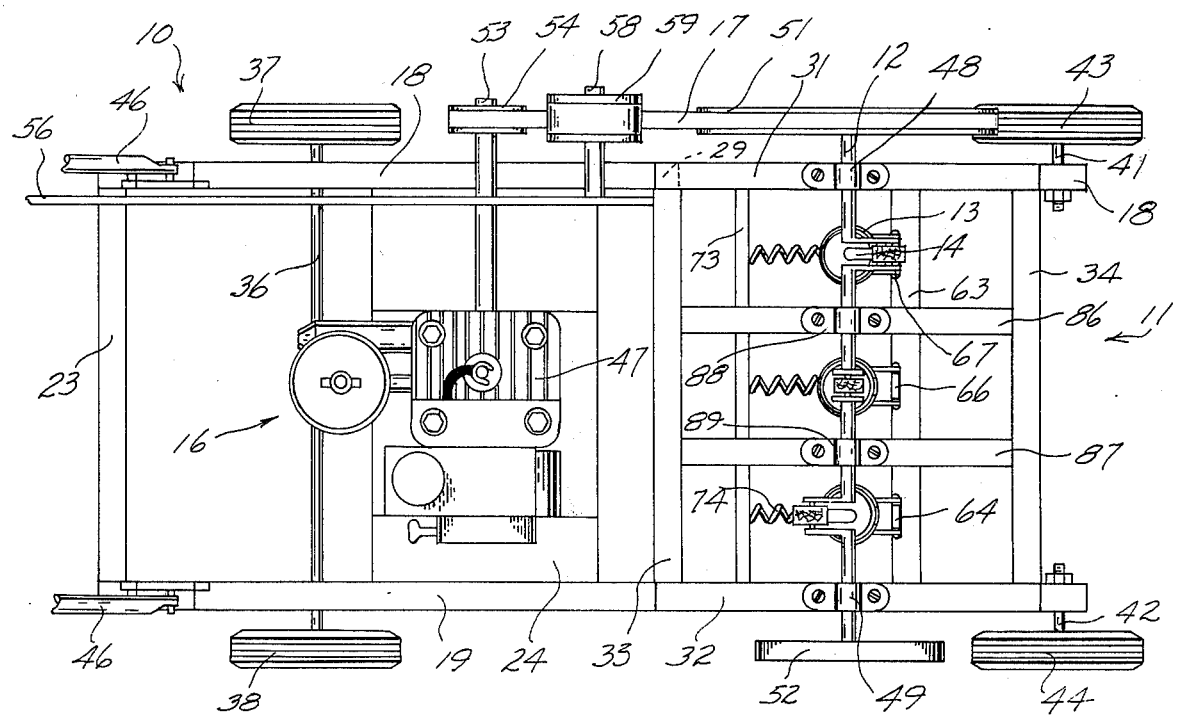
FIG. 2 is a top plan view thereof.

Turning now to FIGS. 1 and 2 of the drawings, there is shown therein the turf perforating device of this invention, generally designated at 10. The device 10 basically includes a wheeled frame 11, a crankshaft 12 rotatably mounted on the frame 11, a plurality of sleeves 13 pivotally connected to the frame, a plurality of reciprocating units 14 connected to the crankshaft 12 with each slidably mounted in a sleeve 13 and a power unit 16 mounted on the frame 11 and operably connected to the crankshaft 12 by a belt 17.

Figure 3:
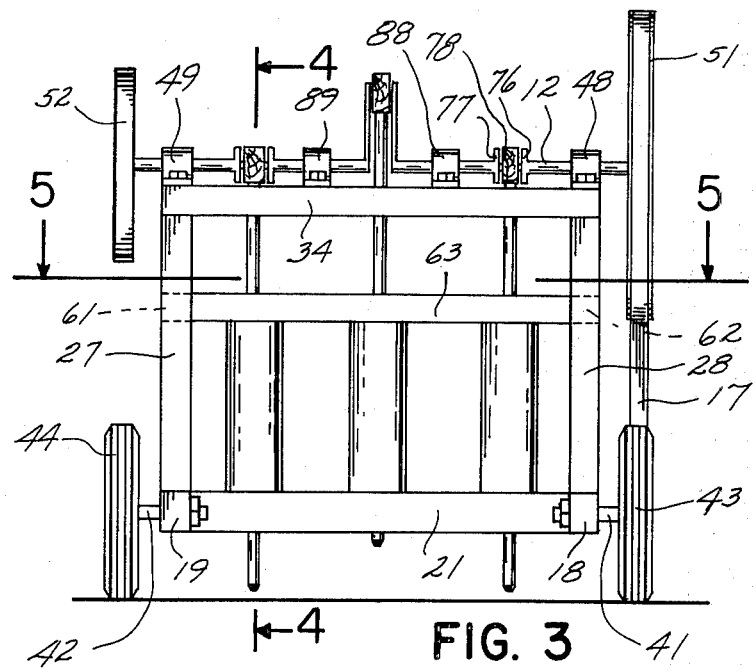
FIG. 3 is a front elevational view thereof.

In particular, the frame 11 includes a pair of parallel side members 18 and 19 (FIG. 2), a forward cross member 21 interconnecting the side members proximate their forward ends, an intermediate cross member 22 (FIG. 4) interconnecting the side members intermediate their ends, and a rear cross member 23 (FIG. 2) interconnecting the side members at their rearward ends. Between the rear and intermediate cross members 23 and 22 and secured between the side members is an engine mount plate 24. Four upright posts 26 – 29 (FIGS. 1, 3 and 4) are secured to the side members at the forward and intermediate cross members 21 and 22 and their upper ends are interconnected by a square frame consisting of two longitudinally disposed links 31 and 32 and to laterally disposed links 33 and 34. A rear axle 36 is secured between the side members 18 and 19 proximate the rear end and projects laterally and outwardly thereof. Rear wheels 37 and 38 are rotatably mounted on the rear axle 36 and support the rear end of the frame above the surface of the ground 39. A pair of short stub axles 41 and 42 are secured one to each of the side members 18 and 19 at their forward ends and each stub axle rotatably receives a front wheel 43 and 44. A portion of a handle assembly 46 is depicted in FIGS. 1 and 2 which is provided to assist an operator in propelling the device across the ground.

Mounted on the engine mount plate 24 is a gasoline engine 47 (FIGS. 1 and 2). Rotatably mounted between the longitudinal links 31 and 32 by a pair of journal clamps 48 and 49 is the crankshaft 12. Secured to one end of the crankshaft 12 is a sheave 51 and to the other end a flywheel 52. The engine 47 has a shaft 53 projecting therefrom and on the free end thereof, in alignment with the crankshaft sheave 51, is secured an engine sheave 54. An endless belt 56 is mounted over the two sheaves 51 and 54. Operably connected to the belt intermediate the sheaves is a belt tightening device comprising a rod 56 pivotally secured to the lateral link 33, a depending arm 57 is secured to the rod 56 and a short axle 58 is secured to the free end of the arm. Rotatably mounted on the axle is a pulley 59 which is engageable with the belt 17. Pivoting of the rod toward the engine forces the pulley 59 against the belt thus causing it to frictionally engage the sheaves, while moving the rod away from the engine moves the pulley away from the belt and thus loosens the belt relative to the sheaves and either can rotate without movement of the belt.

Figure 4:
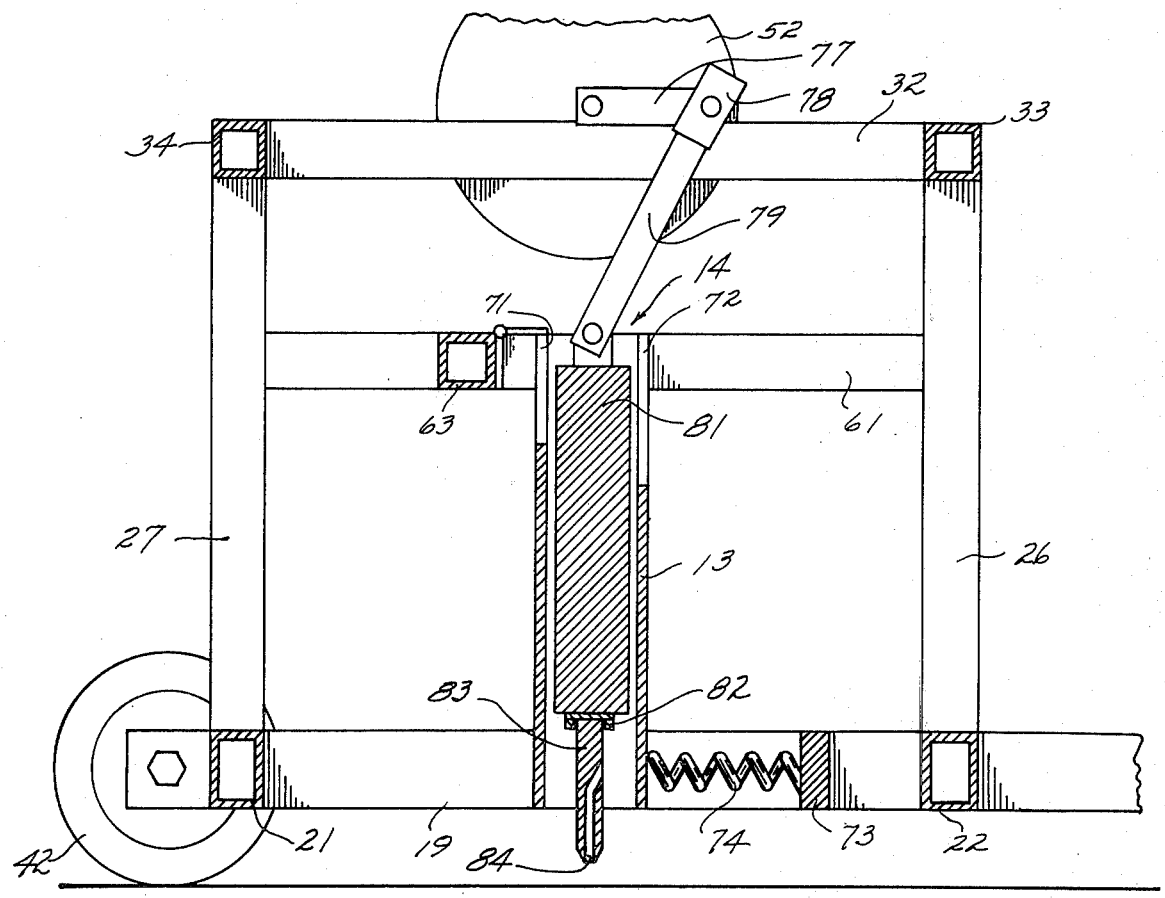
FIG. 4 is a partial sectional view taken along the lines 4 — 4 in FIG. 3.
Figure 5:
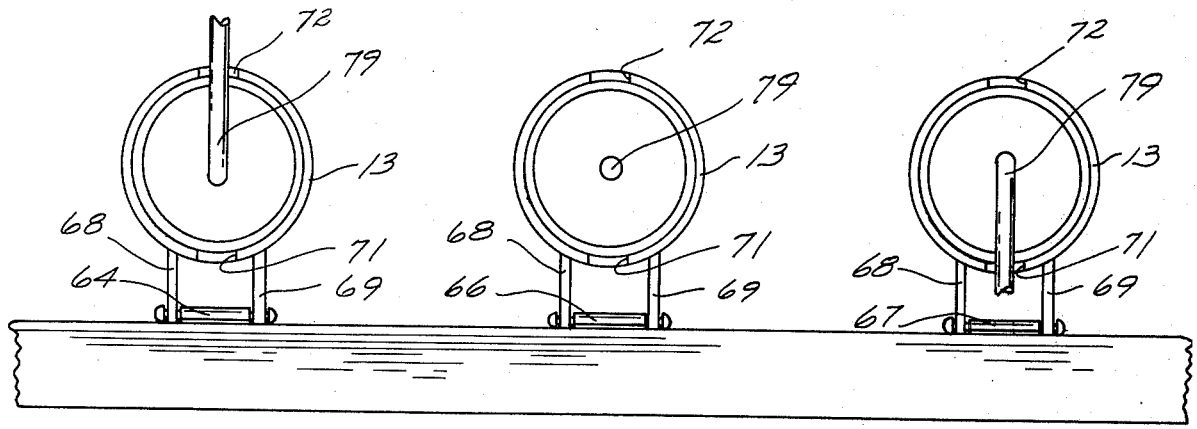
FIG. 5 is a sectional view taken along the lines 5 — 5 in FIG. 3.
Figure 6:
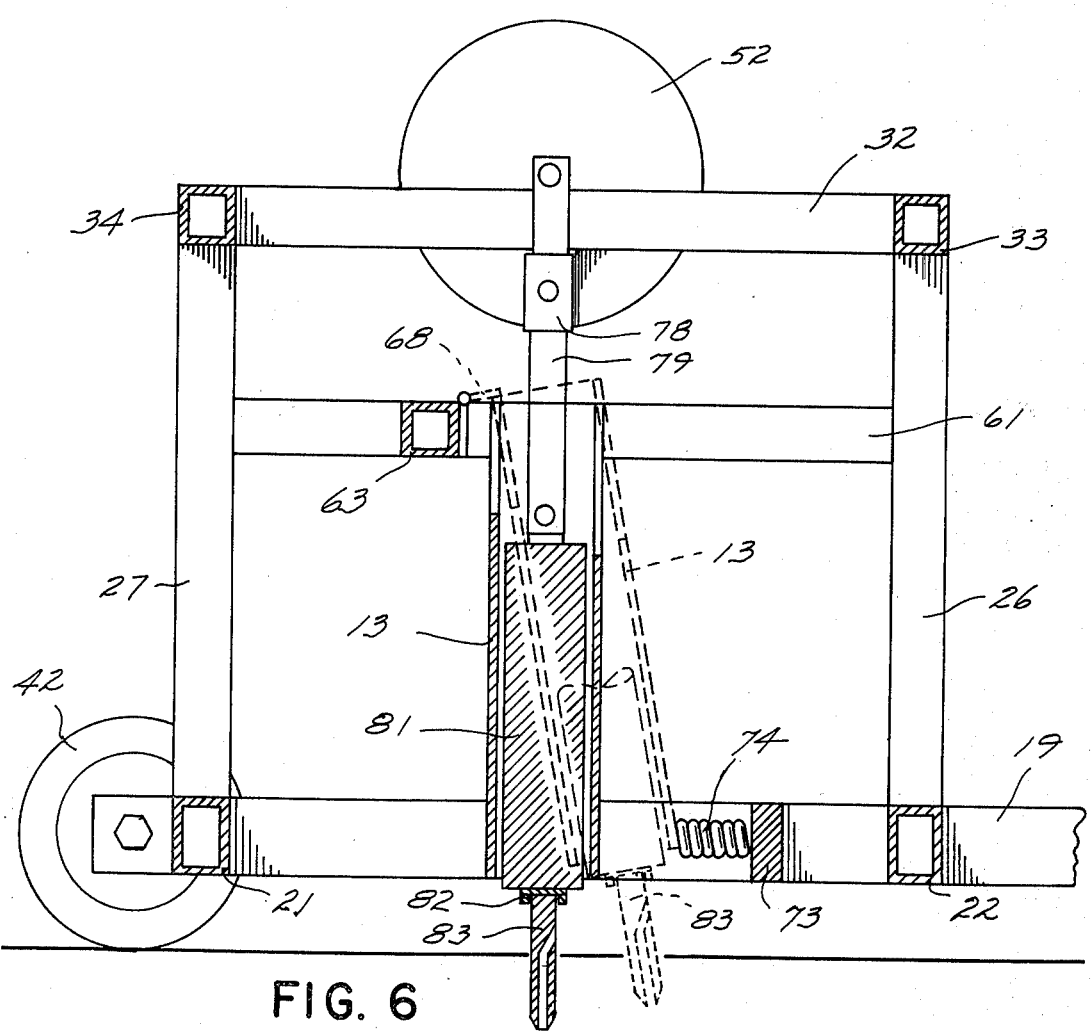
FIG. 6 is a sectional view similar to FIG. 4 with the crankshaft in a different position and depicting the movement sleeve.

Connected between the two posts 26 and 27 below the longitudinal link 32 is a cross link 61 (FIGS. 1 and 3), and a companion, aligned, cross link 62 is connected to the two posts 28 and 29 on the opposite side. Mounted between the two cross links is a sleeve hinge link 63. Secured to the sleeve hinge link 63 are three spaced hinges 64, 66 and 67 (FIG. 5), each having a pair of plates 68 and 69 which project rearwardly thereof. A sleeve 13 is hingedly connected to each pair of plates 68 and 69 and depend therefrom. Each sleeve 13 is an open ended hollow cylindrical member and has a front and a rear longitudinal slot 71 and 72 respectively, formed therein (FIGS. 4 and 5). A bar 73 extends between and is connected on its ends to the side members 18 and 19 behind the lower ends of the sleeves. In longitudinal alignment with each sleeve 13 is a compression spring 74, (FIGS. 2 and 6) which is secured on one end to the bar and on the other end to the lower end of the sleeve.

Slidably disposed in each sleeve 13 (FIGS. 3 and 4) is a reciprocating unit 14 comprising a pair of parallel crank arms 76 and 77 connected on one end to the crankshaft 12. A wooden bearing block 78 is rotatably secured between the free ends of the crank arms 76 and 77. Secured to the bearing block 78 is one end of a connecting end 79 and the other end thereof is pivotally connected to the top end of a piston 81. The bottom end of the piston 81 has a tapped nut 82 secured thereto and one end of a perforating tool 83 is threaded. The tool is threadably mounted in the nut and depends therefrom. The lower end of the tool is tapered and a hole 84 is drilled from the lower end and exits a sidewall of the tool proximate the upper end thereof. Additional braces 86 and 87 are spaced intermediate the longitudinal links 31 and 32 and secured between the lateral links 33 and 34. The crankshaft 12 is journally mounted on each brace by journal clamps 88 and 89.

Reference to FIG. 5 discloses that front and rear slots 71 and 72 are provided to permit the connecting rod to pass therethrough during a portion of each revolution. Elimination of the slots would require a larger sleeve and piston or a longer connecting rod with the sleeve spaced further from the crankshaft. Either solution would add greatly to the weight of the structure and thus, is unacceptable.

Although a sleeve has been depicted herein in which the piston slides, guides could readily be provided to accomplish the same function; i.e., a plurality of spaced upright bars.

Reference to FIG. 1 will disclose that the crank arms 76 and 77 for the reciprocating members are spaced a 90° to each other and cover only 180° or one half of the crankshaft with the other half thereof free. Thus, the crankshaft can be positioned (FIG. 3) wherein the tools are all above the ground.

In operation the clutch rod 56 is moved away from the engine, the crankshaft rotated to a position where all three tools are out of the ground, and the engine is started. The device can be pushed or propelled with the clutch in a so-called neutral position without damage. To perforate the ground the clutch is engaged by moving the rod toward the engine and the crankshaft is caused to rotate. Rotation of the crankshaft actuates the reciprocating units and the tools plug the turf. As the unit is provided for trouble free operation, failure to lubricate the bearings is not a monumental error as they are readily replaceable. However, it has been found that a simple lubrication schedule maintains the blocks in proper condition for operation.

I claim:

1. A turf perforating device comprising:
   a wheeled frame;
   a laterally disposed crankshaft rotatably mounted on said frame;
   power means mounted on said frame and operably connected to said crankshaft;
   a plurality of laterally spaced guide means pivotally connected to said frame below said crankshaft;
   reciprocating means slidably mounted in each said guide means and having one end connected to said crankshaft and having another end depending therefrom;
   a tool connected to the depending end of each said reciprocating means and depending therefrom;
   said power means operable to reciprocate said reciprocating means.

2. A turf perforating device as defined in claim 1 including a spring biasing means connected between said frame and each said guide means for biasing said guide means in a first position, said guide means pivotal from said first position to a second position disposed rearwardly of said first position in response to a rearward movement of said tool.

3. A turf perforating device as defined in claim 2 wherein each said guide means has at least one longitudinally disposed reciprocating means receiving slot formed therein.

4. A turf perforating device as defined in claim 1 wherein said reciprocating means project from only 180° of said crankshaft.

5. A turf perforating device as defined in claim 4 including a spring biasing means connected between said frame and each said guide means for biasing said guide means in a first position, said guide means pivotal from said first position to a second position disposed rearwardly of said first position in response to a rearward movement of said tool.

6. A turf perforating device as defined in claim 5 wherein each said guide means has at least one longitudinally disposed reciprocating means receiving slot formed therein.

7. A turf perforating device as defined in claim 6 wherein each said reciprocating means includes a crank arm having one end secured to said crankshaft, a bearing rotatably secured on one end to the other end of said crank arm, a connecting rod secured on one end to said bearing, and a piston slidably disposed in said guide means and secured on one end to said rod other end and having a free end depending therefrom, and a perforating tool having one end secured to said piston free end and having the other end depending therefrom.

8. A turf perforating device as defined in claim 7 wherein each said spring biasing means is a compression spring.

9. A turf perforating device as defined in claim 8 wherein each said guide means includes a generally vertically disposed, hollow open ended, cylindrical sleeve having a longitudinally disposed front slot and a longitudinally disposed rear slot formed in the upper end thereof, and a hinge unit secured to said sleeve upper end proximate said front slot and to said frame.

10. A turf perforating device as defined in claim 9 wherein said power means includes a motor mounted on said frame and having a sheave mounted on its shaft, a sheave mounted on one end of said crankshaft, an endless belt mounted over said sheaves and a clutch device connected to said frame and operably connected to said belt for tightening and loosening said belt relative to said sheaves.

* * * * *